United States Patent Office 2,854,424
Patented Sept. 30, 1958

2,854,424

SILICONE WATER-REPELLENTS CONTAINING STANNOUS SALTS AND PROCESS OF TREATING TEXTILES THEREWITH

Myer M. Solomon, Albany, and Bruce A. Ashby, Schenectady, N. Y., assignors to General Electric Company, a corporation of New York No Drawing. Application November 22, 1955
Serial No. 548,528

6 Claims. (Cl. 260—29.2)

This invention is concerned with silicone water repellents having improved initial spray ratings and being capable of imparting to textile materials durable water repellency after repeated dry cleanings. More particularly, the invention relates to a water-repellent composition in a liquid vehicle in which the essential ingredients are composed, by weight, of (1) from 25 to 75% of a liquid methyl hydrogen polysiloxane, (2) from 25 to 75% of a curable, non-resinous, fluid product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and from 0 to 10% of a methylchlorodisilane, and (3) a curing agent for the combined mixture of (1) and (2) selected from the class consisting of stannous octoate, stannous oleate, and stannous naphthenate, the curing agent being present in such amount that the tin ion constitutes at least 0.1% of the total weight of (1) and (2).

In the treatment of textile materials with various organopolysiloxanes, it has been found that a specific type of organopolysiloxane imparts to the textile material an initial spray rating of 100, and that when textile materials so treated are subjected to repeated dry cleanings, the spray rating remains high and may be at a level of from about 80 to 90, even after five to seven dry cleanings. However, in order to attain this initial spray rating of 100 and durability to dry cleaning, it has been found essential in the past that the treating organopolysiloxane consist essentially of 100% methyl hydrogen polysiloxane, examples of which may be found in Sauer Patents 2,595,890–891, Wilcock Patent 2,491,843, and in Barry Patent 2,590,812. As an additional requirement for obtaining this initial high spray rating and dry-cleaning durability, zinc octoate has been employed as the catalyst for polysiloxane.

However, the use of these methyl hydrogen polysiloxanes [which may have the formula

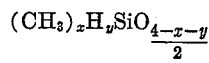

where $x$ has a value from 1.0 to 1.5, $y$ has a value from 0.7 to 1.25 and the sum of $x$ and $y$ is a value from about 2.0 to 2.25, inclusive] for the above purpose has been accompanied by major economic disadvantages. In order to make these methyl hydrogen polysiloxanes, one must employ as a starting material a methyl hydrogen hydrolyzable silane, for instance, one having the general formula

where X is a hydrolyzable radical, for instance, chlorine, bromine, alkoxy (e. g., ethoxy), acetate, etc., radicals. Up to the present time, there has been such a large demand for this methyl hydrogen hydrolyzable silane, and the methods for obtaining such monomeric materials used to make the methyl hydrogen polysiloxanes are so inadequate to supply the demand, that means have been sought to decrease the amount of methyl hydrogen polysiloxane required to give the two important properties of initial high spray rating coupled with durability to dry cleaning. It has been found, for instance, that when one attempts to mix this methyl hydrogen polysiloxane with other methylpolysiloxanes free of silcon-bonded hydrogen, for instance, in the ratios of about equal parts by weight, and employing the zinc octoate, the initial spray rating drops below 100 and may drop as low as 80, while the durability to dry cleaning again is materially reduced so that after perhaps two to four dry cleanings, the spray rating drops below 80 and usually below 70, which renders the material unsatisfactory as a water repellent.

Unexpectedly, we have discovered that we are able to use smaller amounts of these methyl hydrogen polysiloxanes with other methylpolysiloxanes to obtain silcone water repellents which are able to give the initial spray rating of 100 and yet have the desirable durability after as many as 8 to 10 dry cleanings by employing, in place of the zinc octoate as the catalyst, either stannous octoate, stannous oleate, or stannous naphthenate. The use of these three tin soaps is critical if one is to obtain the combination of 100 inital spray rating and durability after repeated dry cleanings with mixtures of methylpolysiloxanes in which substantially large amounts of methylpolysiloxane mixture is one which does not contain the large amounts of methyl hydrogen polysiloxane heretofore thought essential in order to obtain the above two properties.

The tin salts employed in the practice of the present invention which have been found eminently suitable for the purpose are the above-mentioned stannous octoate, stannous oleate, and the stannous naphthenate. These materials have the following formulas:

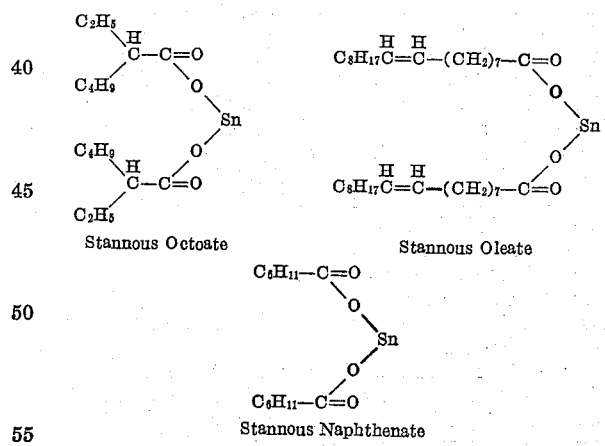

Stannous Octoate

Stannous Oleate

Stannous Naphthenate

The stannous oleate and stannous naphthenate are preferred because the bath life of treating materials using these catalysts are from 4 to 5 times longer than the bath life of treating materials using the stannous octoate as the catalyst.

The amount of the stannous salt employed may be varied widely, depending upon such factors as the application to which the combination of the methylpolysiloxane (hereinafter so designated to mean the organopolysiloxane which is free of silicon-bonded hydrogen) and the methyl hydrogen polysiloxane, the particular methylpolysiloxane and methyl hydrogen polysiloxane employed, etc. Based on the weight of the mixture of methylpolysiloxane and methyl hydrogen polysiloxane, one may advantageously employ the stannous salts in an amount equal to at least 0.5%, by weight, and may range as high as 30 to 40%, by weight. Alternately, the tin in the form of the stannous salt may comprise, by weight, from about 0.1 to 20% or more, based on the total weight of the methylpolysiloxane and methyl hydrogen polysiloxane, optimum results generally being obtained in many applications within the range of from about 1 to 6%, by weight, of tin. Additional factors in choosing the amount of stannous salt will include the medium in which the stannous salt will be used, for instance, aqueous or non-aqueous media, the treating conditions including temperature, and time of treatment.

The methyl hydrogen polysiloxanes employed in the practice of the present invention have the general formula

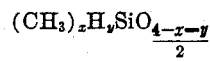

where $x$ and $y$ have the meanings given above. These methyl hydrogen polysiloxanes may contain traces of hydroxy radicals due to the incomplete condensation of the silicols obtained as a result of hydrolysis of intermediate methyl hydrogen hydrolyzable silanes, for instance, methyldichlorosilane. These methyl hydrogen polysiloxanes may be either cyclic or linear polymers. The linear polymers may be chain-stopped with trimethylsilyl groups or even with dimethylsilyl units, as, for instance, units having the formula

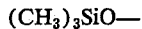

or

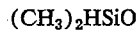

Examples of such methyl hydrogen polysiloxanes may be found in the above-mentioned Sauer, Wilcock and Barry patents.

The methylpolysiloxane substantially free of silicon-bonded hydrogen employed and required in combination with the methyl hydrogen polysiloxanes is a special one and is obtained by hydrolysis of a certain combination of ingredients in particular proportions. The methylpolysiloxane used comprises a polymerizable, fluid, intercondensed product of hydrolysis of a mixture of methylchlorosilanes composed essentially, by weight, of 50 to 75% dimethyldichlorosilanes, 1 to 10% trimethylchlorosilane, 10 to 35% methyltrichlorosilane, and from about 0 to 10% of a methylchlorodisilane (or mixture of methylchlorodisilanes). The methylchlorodisilane or mixture of methylchlorodisilanes may be in the form of tetrachlorodimethyldisilane, pentachloromethyldisilane, trichlorotrimethyldisilane, dichlorotetramethyldisilane, etc., or a mixture of the methylchlorosilanes, either alone or with some hexachlorodisilane. Generally, these methylchlorodisilanes may comprise from about 1 to as high as 10% of the mixture of methylchlorosilanes.

An intermediate hydrolyzable mixture of methylchlorosilanes which can be employed is one obtained by passing methyl chloride over silicon in the presence of copper at elevated temperatures in a manner disclosed and claimed in Rochow Patent 2,380,995, issued August 7, 1945, and assigned to the same assignee as the present invention. The reaction product thus obtained, in addition to containing the above-described methylchlorosilanes in the stipulated proportions, also contains traces of silicon tetrachloride, tetramethylsilane, hexamethyldisilane, methyl-substituted polysilanes containing more than two silicons attached by silicon-silicon linkages, etc. These additional ingredients are present generally in insignificant amounts and may be removed if desired from the hydrolyzable mixture prior to effecting conversion to the methylpolysiloxane state. The usual methods of hydrolysis using water are employed and it is generally desirable to neutralize the HCl formed by washing the hydrolysis product sufficiently to obtain an essentially neutral product. Advantageously, noninterpolymerizable components such as hexamethyldisiloxane or octamethylcyclotetrasilane and products boiling below 100° C. present in the hydrolysis product are removed from the latter.

The combination of the methylpolysiloxane, methyl hydrogen polysiloxane, and the stannous salts may be employed in various media including aqueous and non-aqueous (i. e., organic solvent) media. Thus, if desired, the methylpolysiloxane and the methyl hydrogen polysiloxane may be dissolved in a suitable solvent, for example, toluene, xylene, butanol, etc., and the stannous salt added thereto and also caused to dissolve. In some applications, the stannous salt may be added directly to the mixture of polysiloxanes, and this combination used without any further dilution or dispersion, for instance, with solvents or with water, for treating purposes.

A treating medium which permits optimum utilization of the properties of the stannous salt and the mixture of polysiloxanes is one in which the latter is dispersed in water in the form of an emulsion or an emulsion-dispersion. Such dispersions or emulsions are usually prepared by employing a mixture of water and the polysiloxanes in which the latter comprise, by weight, from about 0.5 to 60% or more of the total weight of the ingredients, adding an emulsifying agent to the mixture of ingredients, and homogenizing the latter until a suitable emulsion is obtained employing usual means for this purpose. Among such emulsifying agents may be mentioned, for instance, polyoxyethylene condensates of fatty amides, as may be obtained by condensing 5 mols of ethylene oxide with 1 mol of cocoamide (mainly $C_{12}$ acid amides), the amide of red oil (mostly oleic acid, which may be obtained by condensing 5 mols of ethylene oxide with oleic acid), the condensation product of ethylene oxide with hydrogenated tall oil (mostly $C_{18}$ fatty amides, i. e., stearamide), sulfonated methyl oleate (the sodium salt), metallic and ammonium salts of lauryl sulfate, tall oil sulfates, cetyl and oleyl alcohol sulfate salts, diethanolamine stearate condensates, etc. The actual amount of emulsifying or dispersing agent employed may be varied widely and generally will comprise from 0.1 to 1%, by weight, based on the weight of the entire treating mixture. It is preferable that the emulsifying agent used be one which maintains a maximum stability of emulsion and permits the deposition of the mixture of the methylpolysiloxane and methyl hydrogen polysiloxane on whatever material is desired prior to breaking of the emulsion or dispersion.

The range of ingredients generally employed in the obtaining of these emulsions (which can be diluted to the desired concentration) comprises, by weight, (1) from 0.2 to 65% of the curable mixture of the methylpolysiloxane and methyl hydrogen polysiloxane (preferably from 0.5 to 35% of this polysiloxane mixture), where the proportions of the methylpolysiloxane and the methyl hydrogen polysiloxane by themselves are those stated previously, (2) from 35 to 99% water and (3) the above stannous salts whose tin ion is advantageously present, by weight, in an amount equal to from 0.1 to 20% of the total weight of the methylpolysiloxane and methyl hydrogen polysiloxane, the sum of the ingredients equalling essentially 100%. Obviously, small amounts of the usual ingredients employed to make emulsions or dispersions, such as emulsifying agents, colloid protectors, etc., may be added.

In order that those skilled in the art may better understand how the invention may be practiced, the following examples are given by way of illustration and not by way of limitation. All parts are by weight.

In the following examples, the methyl hydrogen polysiloxane employed was obtained by cohydrolyzing methyldichlorosilane with a small amount of trimethylchlorosilane so as to obtain a polymeric material having the general formula

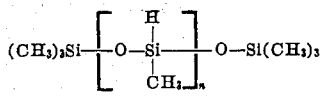

where $n$ is an integer greater than 1, e. g., 2 to 20 or more.

The polymer of this formula used in the following examples was a fluid having a specific gravity of about 0.98 and having a pH of about 7, the value of $n$ averaging about 20 to 25.

The methylpolysiloxane employed in the following examples was obtained by hydrolyzing with water by a continuous method, as is more particularly described in Schwenker patent application Serial No. 281,716, filed April 11, 1952 (now U. S. Patent 2,758,124, issued August 7, 1956), and assigned to the same assignee as the present invention, a mixture of ingredients containing approximately, by weight, about 5% trimethylchlorosilane, 20% methyltrichlorosilane, 70% dimethyldichlorosilane, and about 4 to 8% of a mixture of ingredients composed of chloromethyldisilanes, particularly trichlorotrimethyldisilane and tetrachlorodimethyldisilane. The fluid obtained as a result of this hydrolysis is neutralized with anhydrous sodium carbonate and then filtered. Thereafter, the material is stripped to remove most of the non-inter-condensed volatile materials (e. g., boiling below 100° C.) as, for instance, octamethylcyclotetrasiloxane, hexamethyldisiloxane, etc. The methylpolysiloxane fluid thus obtained had a viscosity of about 100 centistokes at 25° C. This material will hereinafter be referred to as "methylpolysiloxane."

Emulsions were prepared as follows: A master emulsion was prepared in which the amount of siloxane solids, i. e., the mixture of the methylpolysiloxane and methyl hydrogen polysiloxane was about 35%. Each polysiloxane was present in an equal part, by weight. This was done by blending on a colloid mill 2 parts of Ethomid RO/15 (which is the amide of red oil, mainly oleic acid, with 5 mols of ethylene oxide, sold by Armour Chemical Division of Armour and Co., Chicago, Illinois), 105 parts of the mixture of the polysiloxanes, and 50 parts water. After passage through the colloid mill several times, an additional 143 parts water were added, and again the entire mixture repassed through the colloid mill to yield a master emulsion containing about 35% silicone solids. This emulsion will hereinafter be referred to as "master emulsion."

Catalyst emulsions containing stannous oleate, stannous octoate, or stannous naphthenate, were prepared as follows. About 2 parts of Monamine AA–100, manufactured by Mona Industries, Paterson, New Jersey (which is an amide prepared by condensing a long-chain fatty acid such as stearic acid with an alcohol amine, specifically, a diethanol amine stearate condensate) were blended with one part of oleic acid, and to this mixture were added 30 parts of a 50% solution of stannous oleate or stannous octoate in toluene. While continuing to stir, sufficient water was added to give a total of 200 parts of catalyst emulsion. This mixture was passed through a colloid mill to give a catalyst emulsion which contained 1.28% of tin metal in the form of stannous oleate. This material will hereinafter be referred to as "stannous oleate catalyst emulsion" or "stannous octoate catalyst emulsion."

A stannous naphthenate emulsion was prepared as follows. To about 0.5 part of Atlas G–3934 (sold by Atlas Powder Company, Wilmington, Delaware, and being essentially the same as the Ethomid described above) were added 20 parts of a mineral spirits solution of stannous naphthenate containing 10% of the tin metal in the form of the stannous naphthenate. The mixture was stirred in order to achieve complete solution and thereafter 79 parts water were added and the entire mixture colloided until there was obtained an emulsion which contained 2% tin metal. This emulsion will hereinafter be referred to as "stannous naphthenate catalyst emulsion."

EXAMPLE 1

Treating baths for textiles were prepared from the master emulsion and the stannous oleate or stannous naphthenate catalyst emulsion by mixing together 20 parts of the master emulsion (35% silicone solids) with 280 parts water and 22 parts of the stannous oleate or stannous octoate emulsion, or 14 parts of the stannous naphthenate catalyst emulsions. Additional water was added to make a total of 350 parts of pad bath. This material which contained 1% solids (based on the weight of the total emulsion) of the mixture of the methyl hydrogen polysiloxane and methylpolysiloxane was identified as "Treating Bath No. 1" for the stannous oleate catalyst, "Treating Bath No. 2" for the stannous naphthenate catalyst, and "Treating Bath No. 3" for the stannous octoate catalyst.

Into each of the above siloxane or silicone water-repellent compositions were immersed for about 4 seconds, 8 inch by 8 inch squares of cotton cloth, rayon cloth, and nylon cloth, and in some instances, cloth composed of 50% acetate and 50% rayon gabardine (three samples of each cloth). The samples were withdrawn and run through a padder or quetch adjusted to a pressure of about 45 to 60 pounds in order to remove excess treating solution. The cloths were then hung in a 150° C. air-circulating oven for about 5–10 minutes to dry, and to effect curing of the methylpolysiloxane mixture (curing temperatures of from 75° to 250° C. for times ranging from 0.5 to 30 minutes may be used if desired varying the conditions according to the time and temperature employed). Each sample of treated cloth was then conditioned in the air for about 30 minutes and thereafter subjected to spray rating tests similar to those described in the 1953 Technical Manual and Yearbook of the American Association of Textile Chemists and Colorists, volume 29, pages 146 to 147 (Standard Test Method 22–52). The dry-cleaning tests were conducted in accordance with the directions found in the same yearbook on page 106 (Tentative Method 25–52) but omitting the soap; thereafter the spray ratings were conducted in the same way on the dry-cleaned samples. A spray rating of about 80 or above after dry cleaning is considered satisfactory. If the spray rating dropped to 70 for two consecutive dry cleanings, the tests were discontinued. Table I identifies the treating bath used as well as the spray ratings on various kinds of cloth treated with these emulsions.

*Table 1*

A. TREATING BATH NO. 3—PADDING SOLUTION CONTAINING 1% SILICONE + 4% TIN AS STANNOUS OCTOATE

| Test Cloth | Initial Spray Ratings | Spray Ratings after Dry Cleaning | | | | | | |
|---|---|---|---|---|---|---|---|---|
| | | 1 | 2 | 3 | 4 | 5 | 6 | 7 |
| Rayon Gabardine | 100 | 100 | 100 | 90 | 80 | 80 | 80 | 80 |
| Acetate Twill | 100 | 100 | 100 | 90 | 90 | 80 | 80 | 80 |
| 50/50 Acetate Viscose Gabardine | 100 | 100 | 100 | 90 | 90 | 80 | 80 | 80 |
| Nylon Taffeta Type 200 | 100 | 90 | 80 | 80 | 80 | 80 | 80 | 80 |
| Cotton 80 x 80 Print Cloth | 100 | 90 | 90 | 90 | 80 | 80 | 80 | |

B. SAME AS A ABOVE (1% SILICONE) BUT EMPLOYING 4% ZINC METAL IN FORM OF ZINC OCTOATE IN PLACE OF STANNOUS OCTOATE

| Rayon Gabardine | 90 | 80 | 80 | 80 | 80 | 80 | 80 | 80 |
| 50/50 Acetate Viscose Gabardine | 80 | | 80 | 80 | 80 | 80 | 80 | 80 |

C.[1] SAME AS A ABOVE BUT EMPLOYING 1.5% SILICONE AND 4% TIN AS STANNOUS OLEATE

| Rayon Gabardine | 100 | 80 | 80 | 80 | 80 | 80 | 80 | 80 |
| 50/50 Acetate Viscose Gabardine | 100 | 90 | 90 | 80 | 80 | 80 | 80 | 80 |
| Cotton 80 x 80 Print Cloth | 100 | 80 | 80 | 80 | 80 | 80 | 80 | 80 |

[1] Treating Bath No. 1 modified to increase the silicone content to 1.5%, by weight, of the emulsion.

D. SAME AS C BUT ALSO CONTAINING CURABLE, WATER-SOLUBLE, UREA-FORMALDEHYDE RESIN [1] IN AMOUNT EQUAL TO 8% OF WEIGHT OF EMULSION

| | | | | | | | | |
|---|---|---|---|---|---|---|---|---|
| Rayon Gabardine | 100 | 80 | 80 | 80 | 80 | 80 | 80 | 80 |
| 50/50 Acetate Viscose Gabardine | 100 | 90 | 80 | 80 | 80 | 80 | 80 | 80 |
| Cotton 80 x 80 Print Cloth | 100 | 80 | 80 | 80 | 80 | 80 | 80 | 80 |

[1] Rhonite 610 sold by Rohm & Haas Company also contained 5%, by weight, of an organic amine hydrochloride, based on weight of the Rhonite, for curing purposes.

Similar results as shown in A above were obtained where treating bath No. 2 was used (1% silicone) employing 4% tin as stannous naphthenate as the catalyst.

EXAMPLE 2

In this example, two emulsions (without catalyst) of organopolysiloxanes were prepared from the master emulsion similarly as described in Example 1 with the exception that one emulsion contained 2%, by weight, of a 50/50 weight blend of methyl hydrogen polysiloxane and methylpolysiloxane (identified as emulsion A), and the other treating emulsion consisted solely of 2%, by weight, of the methyl hydrogen polysiloxane, without any methylpolysiloxane being present (identified as emulsion B). To each of these emulsions was added, in one instance, zinc octoate in an amount equal to 4% zinc in the form of zinc octoate based on the total weight of the methylpolysiloxane and methyl hydrogen polysiloxane, and in another instance, tin in the form of stannous oleate was added so that there was present about 4% tin based on the total weight of the methyl hydrogen polysiloxane and methylpolysiloxane. Pure viscose-rayon-gabardine (identified as "R") and 50/50 acetate viscose-gabardine (identified as 5/5) were each treated with the various emulsions similarly as was done in Example 1, and the initial spray ratings as well as the spray ratings after dry cleaning were determined for each treated material. The following Table II shows the results of these treatments:

Table II

| Silicone Emulsion | Catalyst Cloth | Initial* Spray Rating | | | Spray Ratings After Dry Cleaning | | | | | |
|---|---|---|---|---|---|---|---|---|---|---|
| | | 1 | 2 | 3 | 1 | 2 | 3 | 4 | 5 | 6 |
| A | Zinc octoate: | | | | | | | | | |
| | 5/5 | 80 | 80 | 90 | 80 | 80 | 80 | 80 | 80 | 80 |
| | R | 80 | 90 | 80 | 80 | 80 | 80 | 80 | 80 | 80 |
| B | Zinc octoate: | | | | | | | | | |
| | 5/5 | 95 | 95 | 100 | 90 | 80 | 80 | 80 | 80 | 80 |
| | R | 100 | 95 | 100 | 100 | 90 | 80 | 80 | 80 | 80 |
| A | Stannous Oleate: | | | | | | | | | |
| | 5/5 | 100 | 100 | 100 | 90 | 80 | 80 | 80 | 80 | 80 |
| | R | 100 | 100 | 100 | 90 | 80 | 80 | 80 | 80 | 80 |
| B | Stannous Oleate | | | | | | | | | |
| | 5/5 | 100 | 100 | 100 | 90 | 90 | 80 | 80 | 80 | 80 |
| | R | 100 | 100 | 100 | 90 | 80 | 80 | 80 | 80 | 80 |

* Tests on three samples.

Obviously, other treating conditions as well as various other aminoplast resins, for instance, other water-soluble curable urea-formaldehyde resins, melamineformaldehyde resins (e. g., trimethylol melamine, hexamethylol melamine, etc.), dimethylol urea, etc., may also be employed without departing from the scope of the invention. Advantageously, the aminoplast resin is present, by weight, in an amount equal to from 3 to 25% or more of the total weight of the treating emulsion. The concomitant presence of the aminoplast resin and the organopolysiloxane mixture in the emulsion imparts to cloth treated therewith improved "hand" or "feel."

In addition to the emulsions described in the foregoing examples, other emulsions employing varying proportions of ingredients within the ranges previously recited may also be employed. It will be obvious that small amounts of other ingredients often employed in making such emulsions or dispersions, such as colloid protectors, etc., may be added. To these emulsions or dispersions may be added the above-mentioned aminoplast resins which should be water-soluble for optimum miscibility or water dispersability, and which may be in various states of incomplete cure.

It will, of course, be apparent to those skilled in the art that the methylpolysiloxane used with the methyl hydrogen polysiloxane may also be one from which the methylchlorodisilane is substantially completely absent and thus, the hydrolyzable chlorosilanes consist, by weight, prior to hydrolysis, of a blend of 10 to 35% methyltrichlorosilane, 50 to 75% dimethyldichlorosilane, and 1 to 10% of trimethylchlorosilane. Substitution of this hydrolysis product for the methylpolysiloxane in the foregoing examples used in the treating emulsions for the textiles, gave almost identical results as far as initial spray ratings and durability to dry cleaning were concerned.

The curable, i. e., heat-curable, mixture of the methylpolysiloxane and the methyl hydrogen polysiloxane containing the above-mentioned class of stannous salts as curing agents, whether in solution or emulsion or dispersion form, can be employed in various applications. Thus, these materials may be used for coating and insulating purposes for conductors, can be used to treat various cellulosic materials to improve their water repellency, etc. Fibrous sheet material, such as textiles, paper, asbestos, or sheet fibre material, etc., when rendered water-repellent with the above-mentioned mixture of ingredients, is readily permeable to air but is water-repellent without interfering with the passage of air through the pores of the fibrous material. Such properties recommend use of these materials for treatment of various leathers, whereby water repellency is induced without interference with the passage of air through the pores of the leather.

What we claim as new and desire to secure by Letters Patent of the United States is:

1. A composition of matter in the form of an aqueous emulsion capable of giving an initial spray rating of 100 and a spray rating of at least 80 after at least six dry cleanings when applied to textile cloth, said composition of matter containing as essential ingredients, on a weight basis, (1) from 25 to 75% of a liquid methyl hydrogen polysiloxane having the formula

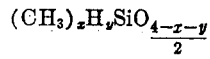

$$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, (2) from 25 to 75% of a polymerizable, fluid, non-resinous product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, and (3) a curing agent for the combined mixture of (1) and (2) selected from the class consisting of stannous octoate, stannous oleate, stannous naphthenate, and mixtures thereof, the curing agent being present in such an amount that the tin ion comprises, by weight, from 0.1 to 20% of the total weight of (1) and (2).

2. An aqueous emulsion which when applied to textile cloth is capable of giving an initial spray rating of 100 and a spray rating of at least 80 after at least six dry cleanings consisting essentially of water and a mixture of ingredients consisting essentially, by weight, of (1) from 25 to 75% of a liquid methyl hydrogen polysiloxane having the formula

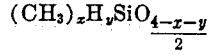

$$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, (2) from 25 to 75% of a polymerizable, fluid, non-resinous, intercondensed product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, and (3) stannous octoate, the tin ion of which is present, by weight, in an amount equal to from 0.1 to 20%, by weight, based on the total weight of (1) and (2).

3. An aqueous emulsion which when applied to textile cloth is capable of giving an initial spray rating of 100 and a spray rating of at least 80 after at least six dry cleanings consisting essentially of water and a mixture of ingredients consisting essentially on a weight basis of (1) from 25 to 75% of a liquid methyl hydrogen polysiloxane having the formula $$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, (2) from 25 to 75% of a polymerizable, fluid, non-resinous, intercondensed product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, and (3) stannous oleate, the tin ion of which is present, by weight, in an amount equal to from 0.1 to 20%, by weight based on the total weight of (1) and (2).

4. An aqueous emulsion which when applied to textile cloth is capable of giving an initial spray rating of 100 and a spray rating of at least 80 after at least six dry cleanings consisting essentially of water and a mixture of ingredients consisting essentially, by weight, of (1) from 25 to 75% of a liquid methyl hydrogen polysiloxane having the formula $$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, (2) from 25 to 75% of a polymerizable, fluid, non-resinous, intercondensed product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, and (3) stannous naphthenate, the tin ion of which is present, by weight, in an amount equal to from 0.1 to 20%, by weight, based on the total weight of (1) and (2.

5. An aqueous emulsion which when applied to textile cloth is capable of giving an initial spray rating of 100 and a spray rating of at least 80 after at least six dry cleanings consisting essentially, by weight, of (1) from 0.2 to 65% of a mixture of ingredients consisting essentially, by weight, of (a) from 25 to 75% of a liquid methyl hydrogen polysiloxane having the formula $$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, and (b) from 25 to 75% of a polymerizable, fluid, non-resinous, intercondensed product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, (2) from 35 to 99% water, and (3) a tin salt selected from the class consisting of stannous octoate, stannous oleate and stannous naphthenate, the latter salt being present in such an amount that the tin ion comprises, by weight, from 0.1 to 20% of the total weight of (a) and (b), the sum of ingredients (1), (2) and (3) equaling essentially 100%.

6. The process for treating textiles to give an initial spray rating of 100 and a spray rating of at least 80 after at least six dry cleanings, which process comprises immersing the textile in an aqueous emulsion containing an essential mixture of ingredients consisting essentially, by weight, of (1) from 25 to 75% of a liquid methyl hydrogen polysiloxane having the formula $$(CH_3)_x H_y SiO_{\frac{4-x-y}{2}}$$

where $x$ is a value of from 1.0 to 1.5, $y$ is a value from 0.7 to 1.25, and the sum of $x$ and $y$ is a value from about 2.0 to 2.25, inclusive, (2) from 25 to 75% of a polymerizable, fluid, non-resinous, intercondensed product of hydrolysis of a mixture of methylchlorosilanes composed essentially, by weight, of 50 to 75% dimethyldichlorosilane, 1 to 10% trimethylchlorosilane, 10 to 35% methyltrichlorosilane, and less than 10% of a methylchlorodisilane, and (3) a curing agent for the combined mixture of (1) and (2) selected from the class consisting of stannous octoate, stannous oleate and stannous naphthenate, the curing agent being present in such an amount that the tin ion comprises, by weight, from 0.1 to 20% of the total weight of (1) and (2), and thereafter heating the treated cloth at a temperature of from about 75° to 250° C. for from ½ minute to 30 minutes to effect curing of the methylpolysiloxane mixture and to induce the above-described water repellency.

References Cited in the file of this patent

UNITED STATES PATENTS

| | | |
|---|---|---|
| 2,449,572 | Welsh | Sept. 21, 1948 |
| 2,456,783 | Hyde | Dec. 21, 1948 |
| 2,588,365 | Dennett | Mar. 11, 1952 |
| 2,612,482 | Rasmussen | Sept. 30, 1952 |
| 2,727,875 | Mack | Dec. 20, 1955 |
| 2,750,305 | Gagarine et al. | June 12, 1956 |
| 2,757,152 | Solomon | July 31, 1956 |

FOREIGN PATENTS

| | | |
|---|---|---|
| 686,575 | Great Britain | Jan. 28, 1953 |